(12) United States Patent
Farnham (10) Patent No.: US 10,567,918 B2
(45) Date of Patent: Feb. 18, 2020

(54) RADIO-LOCATION METHOD FOR LOCATING A TARGET DEVICE CONTAINED WITHIN A REGION OF SPACE

(71) Applicant: Kabushiki Kaisha Toshiba, Minato-ku (JP)

(72) Inventor: Timothy David Farnham, Bristol (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 15/817,747

(22) Filed: Nov. 20, 2017

(65) Prior Publication Data

US 2019/0158982 A1 May 23, 2019

(51) Int. Cl.
*H04W 4/02* (2018.01)
*H04W 64/00* (2009.01)
(Continued)

(52) U.S. Cl.
CPC ............ *H04W 4/025* (2013.01); *G01S 5/0242* (2013.01); *G01S 5/0252* (2013.01); *G01S 5/0284* (2013.01);
(Continued)

(58) Field of Classification Search
CPC ....... H04W 4/043; H04W 4/02; H04W 4/025; H04W 64/003; H04W 4/029; H04W 4/80;
(Continued)

(56) References Cited

U.S. PATENT DOCUMENTS 6,971,063 B1* 11/2005 Rappaport ............ H04L 41/145
709/203
9,980,092 B1* 5/2018 Wirola .................. H04W 4/023
(Continued)

FOREIGN PATENT DOCUMENTS

JP 2011-099753 A 5/2011
JP 2013-524686 A 6/2013
JP 6041944 B1 12/2016

OTHER PUBLICATIONS

Office Action dated Feb. 12, 2019, in Japanese Patent Application No. 2018-024507.
(Continued)

*Primary Examiner* — Daniel Lai
(74) *Attorney, Agent, or Firm* — Oblon, McClelland, Maier & Neustadt, L.L.P.

(57) ABSTRACT

A radio-location method of locating a target device that is contained within a region of space, comprising obtaining a first set of detected signals by detecting, at a plurality of points in space, a beacon signal from the target device, or by detecting at the target device, beacon signals sent from one or more radio transmitters in the region of space; determining a current estimate of the target device's location; obtaining successive sets of detected signals, for each successive set of detected signals: determining one or more candidate locations for the target device; comparing the candidate locations with a radio map of the region of space, identifying one or more feasible candidate locations that are consistent with the radio map; determining a new estimate of the target device's location based on the one or more feasible candidate locations; and setting the new estimate as the current estimate of the target device's location.

13 Claims, 7 Drawing Sheets

(51) Int. Cl.
*G01S 5/02* (2010.01)
*H04B 17/318* (2015.01)

(52) U.S. Cl.
CPC ........ *H04B 17/318* (2015.01); *H04W 64/003* (2013.01)

(58) Field of Classification Search
CPC ..... H04W 4/021; H04W 4/90; H04W 64/006; H04W 64/00; H04W 4/023; G01S 5/0252; G01S 5/0242; G01S 5/0284; G01S 5/02; G01S 13/42; G01S 1/028; G01S 2205/008; G01S 5/0009; G01S 5/0018; G01S 5/0054; G01S 5/0257; G01S 5/0278; G01S 5/06; G01S 13/345; G01S 17/42; G01S 5/10; G01S 5/14; G01S 11/02; G01S 11/06; G01S 13/103; G01S 13/22; G01S 13/282; G01S 13/30; G01S 13/32; G01S 13/4454; G01S 13/524; G01S 13/56; G01S 13/582; G01S 13/583; G01S 13/84; G01S 13/86; G01S 13/87; G01S 15/8913; G01S 17/66; G01S 5/0226; G01S 5/0263; G01S 7/006; G01S 7/023; G01S 7/412; G01S 7/415; H04B 17/318

See application file for complete search history.

(56) References Cited

U.S. PATENT DOCUMENTS

| | | | |
|---|---|---|---|
| 2006/0267833 A1* | 11/2006 | Langford | G01S 5/0252 342/174 |
| 2011/0059752 A1 | 3/2011 | Garin et al. | |
| 2013/0053056 A1* | 2/2013 | Aggarwal | G01S 5/0263 455/456.1 |
| 2013/0344886 A1 | 12/2013 | Jarvis et al. | |
| 2015/0057031 A1 | 2/2015 | Tidd et al. | |
| 2015/0063135 A1* | 3/2015 | Park | H04W 24/08 370/252 |
| 2015/0099539 A1* | 4/2015 | Titus | H04W 64/00 455/456.1 |
| 2015/0119076 A1 | 4/2015 | Cohen | |
| 2015/0312774 A1* | 10/2015 | Lau | H04W 16/20 455/446 |
| 2015/0382153 A1* | 12/2015 | Otis | H04W 4/043 455/456.2 |
| 2016/0127931 A1 | 5/2016 | Baxley et al. | |

OTHER PUBLICATIONS

Office Action dated Aug. 20, 2019, in Japanese Patent Application No. 2018-024507.

\* cited by examiner

RADIO-LOCATION METHOD FOR LOCATING A TARGET DEVICE CONTAINED WITHIN A REGION OF SPACE

TECHNICAL FIELD

Embodiments described herein relate to a radio-location method for locating a target device contained within a region of space.

BACKGROUND

Radiolocation is an established technique for determining the location of a target device. The target is provided with a radio tag that will transmit beacon signals to one or more remote detectors, or alternatively receive beacon signals from one or more remote radio transmitters, at periodic intervals. By detecting the beacons signals, it is possible to infer information about the target location.

Conventional radiolocation methods exploit measurements of the angle of arrival (AoA) or time of arrival (ToA) or perform a multi-lateration or intersection test (such as triangulation) to compute the most likely location of the target. The most likely candidate location then has to be selected by a selection process which can consider the prediction of the likely movement of the target from prior estimates. However, the presence of propagation anomalies such as multi-path reflection, interference and shadowing can result in spurious location candidates. These anomalies cannot be easily eliminated if they appear equally likely to be valid. In addition, some measurements may have unknown or inaccurate reference location estimates. Hence, the multi-lateration or intersections will also result in the propagation of the inaccurate or unknown location estimates.

BRIEF DESCRIPTION OF DRAWINGS

Embodiments of the invention will now be described by way of example with reference to the accompanying drawings in which.

DETAILED DESCRIPTION

According to a first embodiment, there is provided a radio-location method of locating a target device that is contained within a region of space, the method comprising:
obtaining a first set of detected signals by detecting, by one or more detectors at a plurality of points in space, a beacon signal from the target device, or by detecting at the target device, beacon signals sent from one or more radio transmitters in the region of space;
determining, based on the characteristics of the first set of detected signals, a current estimate of the target device's location;
obtaining successive sets of detected signals, each set of detected signals being obtained by detecting, at the one or more detectors, a beacon signal from the target device, or by detecting at the target device, beacon signals sent from the one or more radio transmitters;
for each successive set of detected signals:
retrieving the current estimate of the target device's location;
determining, based on characteristics of the set of detected signals and the current estimate of the target device's location, one or more candidate locations for the target device at the present point in time;
comparing the candidate locations with a radio map of the region of space, the radio map identifying obstructions to radio wave propagation contained within the region of space;
identifying, from the one or more candidate locations, one or more feasible candidate locations that are consistent with the radio map;
determining a new estimate of the target device's location based on the one or more feasible candidate locations; and
setting the new estimate as the current estimate of the target device's location.

The radio map may be updated each time a successive set of detected signals is obtained. The radio map may be updated by comparing an expected value for each one of the detected signals with the actual measured value of the detected signal.

The step of determining one or more candidate locations for the target device may comprise determining an estimated speed and/or direction in which the target is moving relative to the one or more detectors or radio transmitters, based at least in part on one or more previous sets of detected signals. The speed and/or direction in which the target is moving may be estimated based at least in part on measurements obtained from a magnetic compass or inertial sensor attached to the target device.

The step of determining one or more candidate locations for the target device may comprise determining, based on characteristics of the set of detected signals, a preliminary set of one or more candidate locations, and discarding, from the preliminary set of one or more candidate locations, one or more candidate locations that are not consistent with the current estimate of the target device's location. The step of comparing the candidate locations with a radio map of the region of space may be carried out using the preliminary set of one or more candidate locations, with the candidate location(s) that are not consistent with the current estimate of the target device's location having been discarded. In the event that each one of the preliminary set of candidate locations is discarded, the method may comprise revising the estimated speed and/or direction in which the target device is moving.

According to a second embodiment, there is provided a computer readable storage medium comprising computer executable instructions that when executed by a computer will cause the computer to carry out a method according to the first embodiment.

According to a third embodiment, there is provided a radio-location method of locating a target device that is contained within a region of space, the method comprising:

obtaining a first set of detected signals by detecting, by one or more detectors at a plurality of points in space, a beacon signal from the target device, or by detecting at the target device, beacon signals sent from one or more radio transmitters in the region of space;

determining, based on the characteristics of the first set of detected signals, a current estimate of the target device's location; and for each of one or more iterations:

predicting, based at least in part on the current estimate of the target device's location, one or more new candidate locations for the target device;

comparing the candidate locations with a radio map of the region of space, the radio map identifying obstructions to radio wave propagation contained within the region of space;

identifying, from the one or more candidate locations, one or more feasible candidate locations that are consistent with the radio map;

determining, based on the feasible candidate locations, a sub-region of space in which the target device is predicted to be located;

obtaining a further set of detected signals by detecting, at one or more detectors in the sub-region of space, a beacon signal sent from the target device, or by detecting at the target device, beacon signals sent from one or more radio transmitters in the sub-region of space;

determining, based on characteristics of the further set of detected signals and the one or more feasible locations, a new estimate of the target device's location; and setting the new estimate as the current estimate of the target device's location.

The radio map may be updated each time a successive set of detected signals is obtained. The radio map may be updated by comparing an expected value for each one of the detected signals with the actual measured value of the detected signal.

The step of determining one or more candidate locations for the target device may comprise determining an estimated speed and/or direction in which the target is moving relative to the one or more detectors or radio transmitters, based at least in part on one or more previous sets of detected signals. The speed and/or direction in which the target is moving may be estimated based at least in part on measurements obtained from a magnetic compass or inertial sensor attached to the target device.

According to a fourth embodiment, there is provided a computer readable storage medium comprising computer executable instructions that when executed by a computer will cause the computer to carry out a method according to the third embodiment.

In embodiments described herein, the target device may transmit radio signals to one or more detectors located at a plurality of points in space, or alternatively may receive beacon signals sent from one or more radio transmitters in a region of space. By analysing one or more of (i) the amplitude of the detected signal levels, (ii) the time of arrival of the signals at the detector(s) and (iii) angle of arrival (or departure) of the signal in each path, it is possible to determine candidate locations at which the target is likely located at a particular point in time, and further to generate a radio map for use in eliminating spurious candidate location estimates. Embodiments exploit the prediction of the radio environment to assist in estimating the movement and location of the target. By predicting the locations of obstructions (e.g. walls) the non-line of sight paths can be eliminated and changes in the direction of movements more accurately estimated to reduce the number of measurements and time required to get and accurate fix on the target's location.

In contrast to conventional radio mapping methods, embodiments described herein can exploit the correlation between movement and the environment; specifically, embodiments can infer the location of physical obstructions in order to predict the likeliness of future device movements. For instance, if a wall can be predicted in front of a moving target, the target is likely to turn (change direction) to move along the wall. Hence, knowing the presence and direction of the wall can assist in localisation of moving devices. Also, the corridor effect is a classic problem for accurate localisation as angle of arrival measurements will likely change over relatively small variations giving rise of larger error regions. Therefore, predicting the speed of target movements and direction of the corridors can enhance the process of determining the target location.

Figure 1:
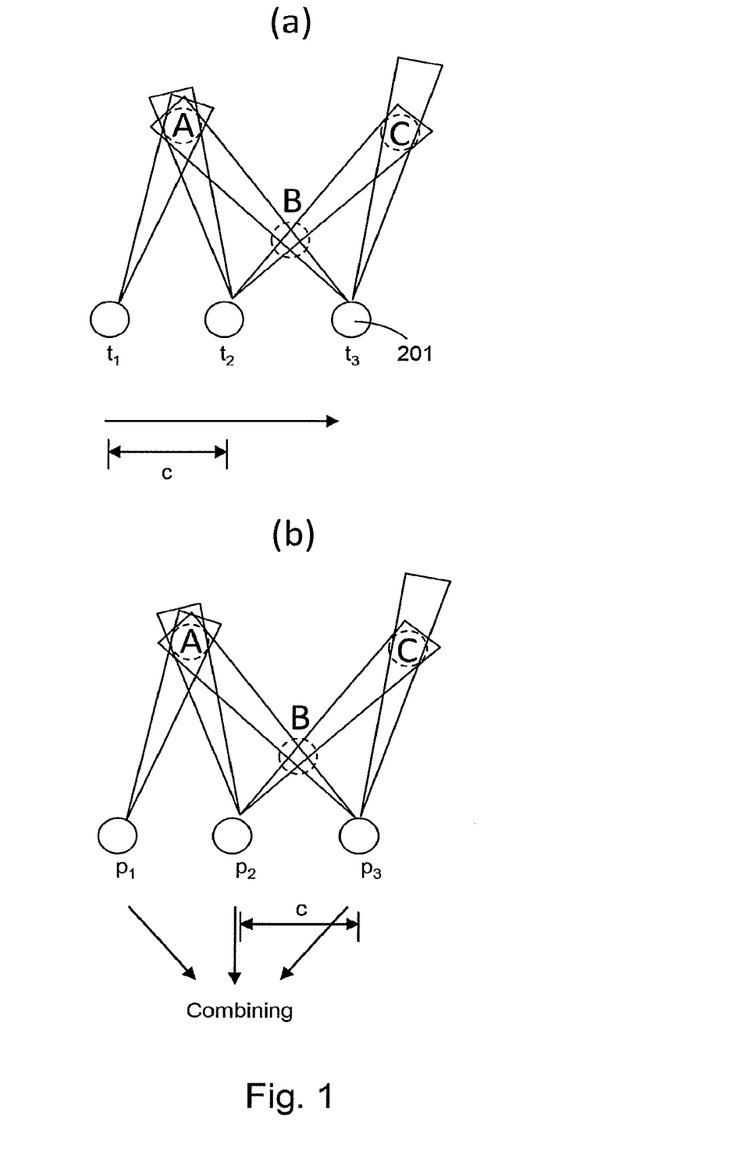
FIG. 1 shows examples of how multiple candidate locations for a radio tag may be identified based on the signals received from the tag at one or more detector(s)

FIG. 1 shows examples of how multiple candidate locations for a radio tag may be identified based on the signals received from the tag at one or more detector(s). In the present example, the radio tag emits radio waves either continuously or periodically and the characteristics of the signal as received at the detector(s) can be used to infer information about the tag's location in space.

In the example shown in FIG. 1(a), a single detector 101 moves relative to a stationary tag, collecting signals from the tag at temporal measurement points $t_1$, $t_2$, $t_3$. The detector moves a distance c in the interval between collecting each signal. At each point, the detector receives signals along one or more signal propagation paths. Where those paths are seen to intersect one another at a particular point in space, it is possible to infer the presence of the tag in that location. However, the presence of symmetry and multipath anomalies means that signals can appear to emanate from multiple points in space; as shown in FIG. 1(a), the paths along which signals are received at the temporal measurement points $t_1$, $t_2$, $t_3$ all intersect at point A, whilst the paths along which signals are received at the time points $t_2$ and $t_3$ also intersect at points B and C. The presence of these multiple intersection points yields uncertainty in the precise location of the tag. FIG. 1(b) shows a similar example, in which multiple stationary detectors are used to detect signals from a moving radio tag. The detectors are located at respective points $p_1$, $p_2$, $p_3$ (each separated by a distance c). Here, the situation is still the same as that shown in FIG. 1(a), with the presence of multipath anomalies and symmetry providing a number of possible candidate locations for the tag.

In embodiments described herein, the location of the tag can be resolved by performing operations on a limited subset of collected data that corresponds to a number of recently acquired individual signal path vectors. The subset may be both temporally and spatially restricted to avoid the propagation of errors and also to eliminate the use of stale data that may no longer be valid. The signal path vectors may be collected periodically and stored in a database and correlated over time and space to identify the transmitter locations and signal attenuation (obstruction) anomalies. The anomalies may be further filtered to remove spurious data and interpolated from discrete candidate locations to reduce the number of measurement points required and to predict the extent of the physical obstructions. The estimated attenuation along paths may be interpolated within a radio map. The estimated attenuation may be used to perform an obstruction prediction and validity check on the candidate locations to eliminate spurious estimates and predict the target direction changes as follows:

1) Compute candidate location estimates from various reference signals using angle, signal strength or time of arrival (or combinations of those techniques).
2) Check the feasibility of future candidate locations (with radio map assistance):
   a) Determine the feasibility of the candidates (given the obstruction locations and movement prediction)
   b) Update the direction/speed assumptions.
3) Update the radio map—predict obstruction locations based on historic signal error—filtered and interpolation over a spatial area.
4) Calculate future location error regions—prediction based on movement of the device in certain direction and speed (i.e. using Kalman filter or similar technique).

The approach can be used, for example, in one of two modes; a map assisted mode in which the map is only used to select the candidates and a map guided mode in which the map can be used to select the region in which to focus on calculating candidates. The latter approach is beneficial to reduce complexity or power consumption and to also select the most appropriate subset of measurement points (references) or techniques to use in order to obtain or combine the candidates.

Figure 2:
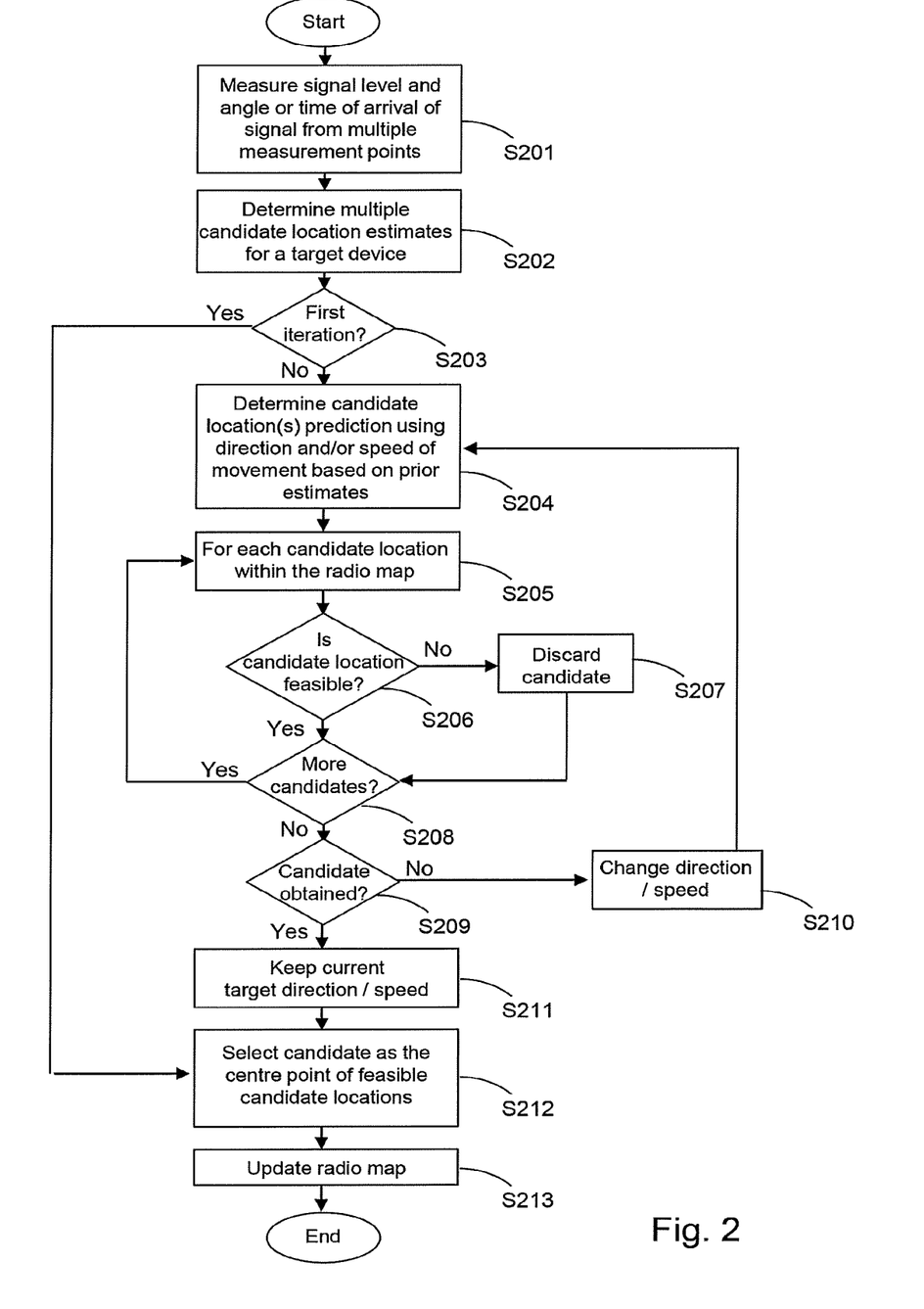
FIG. 2 shows a flow-chart of steps carried out in a method according to an embodiment.

The flow-chart of FIG. 2 shows a sequence of steps as used in the "map assisted mode" according to an embodiment. The method commences in step S201 by measuring one or more of the signal level, angle, and time of arrival of signals at the different measurement points. As noted above, the measurement points may be defined by separate detectors spaced apart from one another, or a single detector that moves relative to a stationary target and which detects the signal at a series of temporal points. In other embodiments, the target itself may include a detector, which comprises a measurement point and which may be used to determine the target's location by reference to a plurality of incoming signals from sources e.g. radio emitters in the target's vicinity.

Based on the measured signals, one or more candidate locations for the target are identified (step S202). If this is the first iteration of the method i.e. the first time that a series of candidate locations has been identified (step S203), the method proceeds to step S212, in which a single candidate location is identified as being the centre point of the candidates identified in step S202. Otherwise, the method proceeds to step S204. Here, the candidate locations determined in previous iterations are used to determine a speed and direction of movement of the target device relative to the detector(s); the data is then used to refine the present set of estimated candidate locations for the target—by using a standard Kalman filter, for example. The method next proceeds to step S205, in which the current set of candidate locations are compared with a radio map, and those candidate locations that are not identified as being in a feasible location (because they are identified as being located behind an obstruction such as a wall, for example) are discarded. Once all present candidates have been evaluated (step S208), a determination is made in step S209 as to whether or not there is at least one candidate location that is feasible in view of the radio map. If there is no such candidate, then the method proceeds to step S210 and the presumed speed/direction of the target is modified and the method returns to step S204. Otherwise, the current speed/direction is maintained for the next iteration (step S211) and the method continues with step S212 by selecting the centre point of the valid candidates as the target location for input in the next iteration. Finally, in step S212 the radio map is updated based on the measurements received in the present iteration.

Figure 3:
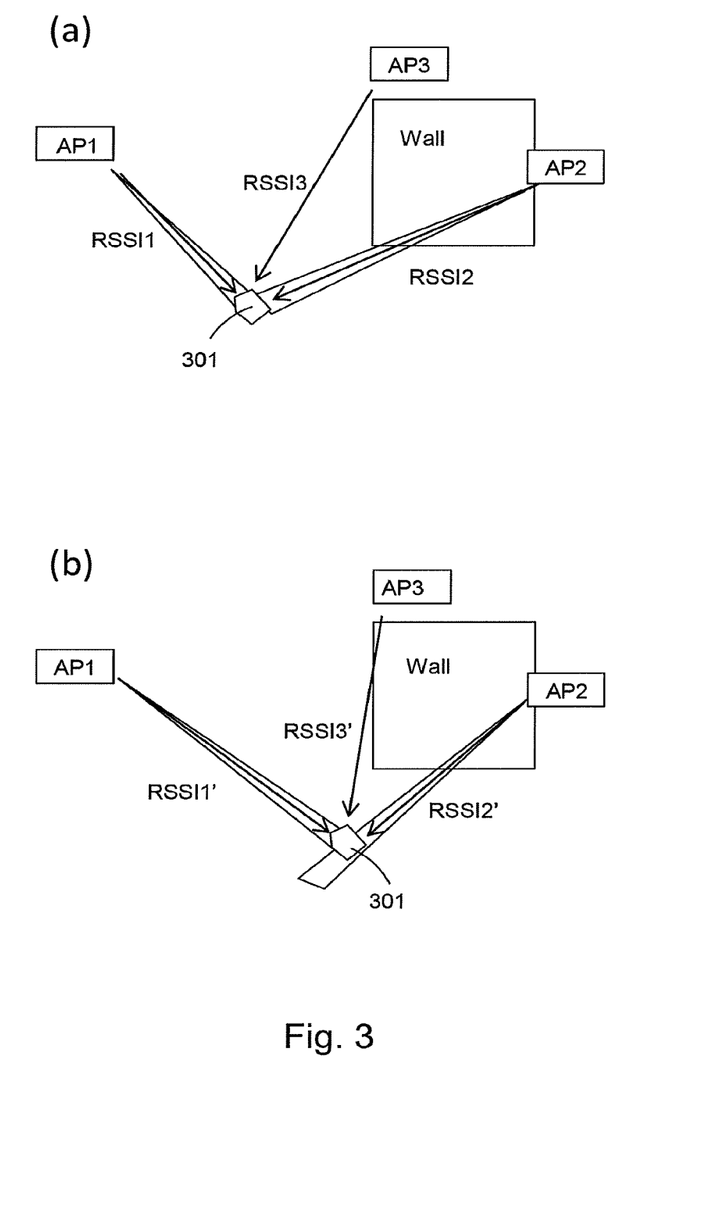
FIG. 3 shows an example radio environment in which radio mapping is used to identify an obstruction in the form of a wall.

The radio map is updated in step S212 by comparing the signal strengths seen at different detector locations against the signal strength as expected from previous measurements and/or by comparison with measurements at other ones of the detector locations. The principle can be understood with reference to FIG. 3, which indicates the method of detection of obstructions in the environment. Here, the example environment comprises three detector points AP1, AP2, AP3 and a radio tag 301. A wall separates AP2 and AP3, with detector AP2 positioned in front of the wall and AP3 behind the wall. In an initial iteration, shown in FIG. 3(a), signals RSSI1, RSSI2 and RSSI3 are detected by the respective detectors. At a later temporal measurement point, shown in FIG. 3(b), signals RSSI1', RSSI2' and RSSI3' are detected. The motion of the tag 301 means that at the temporal point in FIG. 3(b), the signal path between the tag and the detector AP3 is obscured by the wall, with a resultant fall in the relative strength of the signal RSSI3'. By comparing the expected signal level RSSI3 (i.e. the signal expected in the absence of such an obstruction) with the measured signal level (RSSI3'), the vector on which the attenuation lies can be determined, and the presence of the obstruction (the wall) in the environment inferred. (It will be understood that the reduction caused by the obstruction will itself carry through to identifying a different candidate location from that which is estimated by the Kalman filter; hence if there is a large and consistent discrepancy this reinforces the location of the obstruction within the radio map. Hence, in the next iteration it is possible for candidate locations to be eliminated if they are not consistent with this new understanding of the radio environment).

Figure 4:
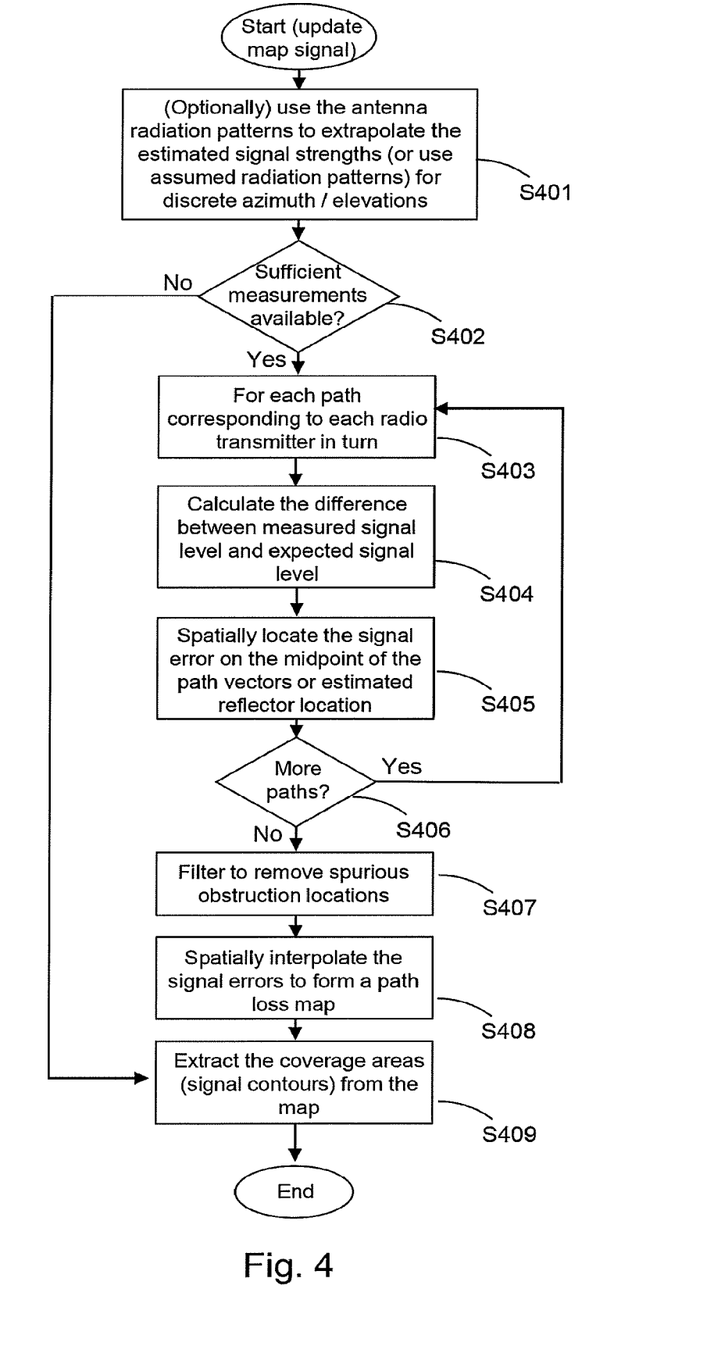
FIG. 4 shows a flow-chart of steps carried out in a method according to an embodiment.

The steps involved in updating the radio map are shown in more detail in the flow-chart of FIG. 4. In step S401, the estimated signal strengths for the different detector locations are obtained. If sufficient measurements are available (step S402), the method proceeds to steps S403 to S405, in which the differences between the measured signal strength and the expected signal strength are determined for each signal path. Once all paths have been evaluated (step S406), the results are filtered to remove spurious obstructions locations (for example, ones that conflict with other results) and the results combined to distinguish regions with radio coverage from regions without (steps S407 to S409).

Figure 5:
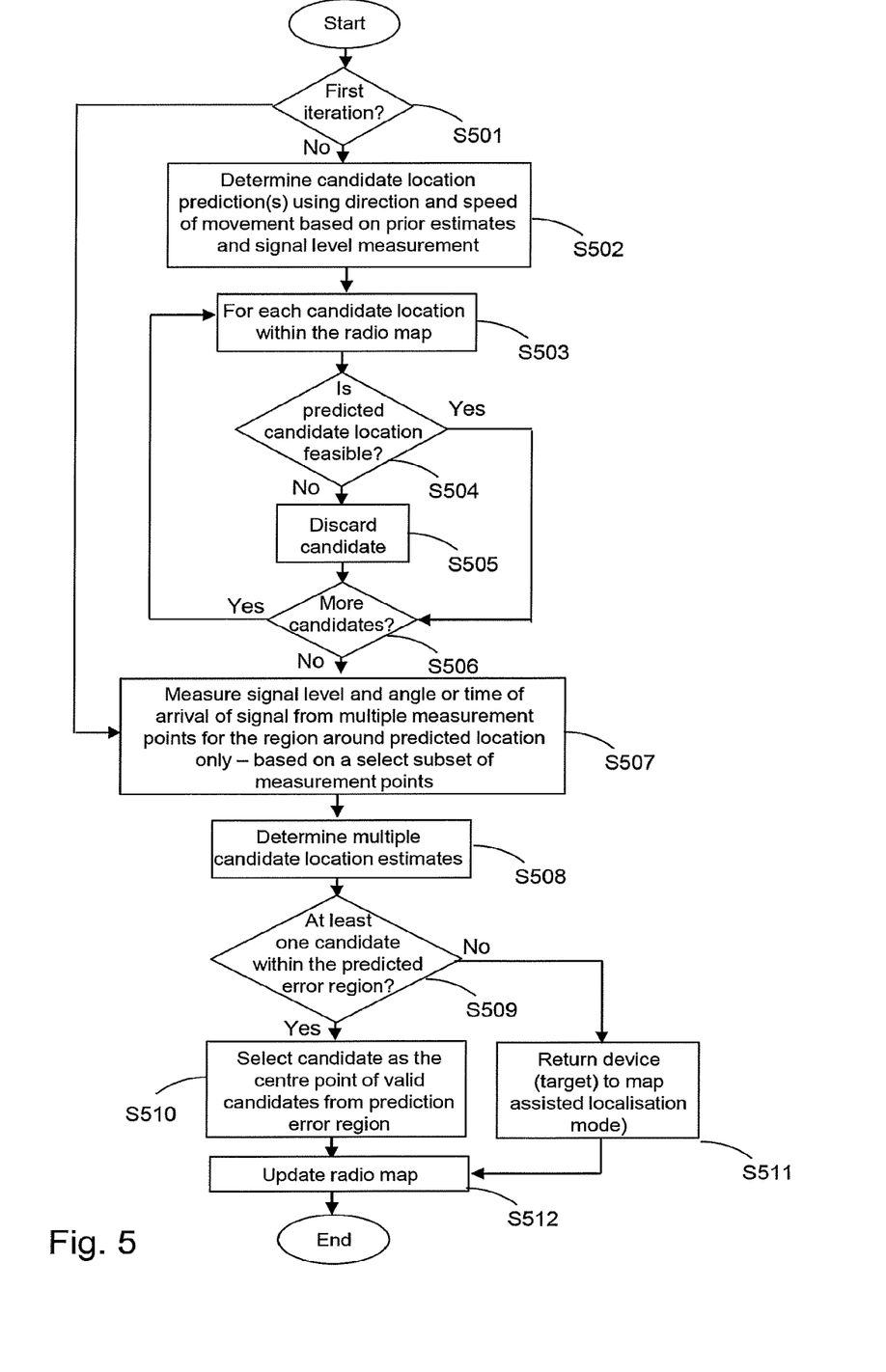
FIG. 5 shows a flow-chart of steps carried out in a method according to an embodiment.

FIG. 5 shows a sequence of steps for localising the tag, as used in the "map guided mode" according to another embodiment. In this approach, the radio map is used to help to select the region in which the target device is likely to reside before measurements are carried out. In the first iteration, the method commences at step S507 in which the signal levels and angle or time of arrival of signals are measured in a selected region of space. In subsequent iterations, the method first proceeds via step S502, in which predicted candidate locations are obtained in a similar way to that described above in relation to FIG. 2, by inputting the measurement data from previous iterations into a Kalman filter, for example. Next, in steps S503 to S506, the predicted candidate locations are compared with the radio map data to identify those candidates that are feasible and to discard any that are blocked by obstructions. Having identified possible candidate locations, the signal levels and angle or time of arrival of signals are measured in the region around the predicted candidate location(s), by using a subset of the detectors located in that region, for example (step S507). In step S508, the data obtained from the detectors in that region is used to determine candidate locations and a determination is made as to whether any of those candidate locations are contained within that region (step S509). In the event there are one or more such candidate locations, the method proceeds to step S510 and selects as the final candidate for the present iteration the centre point of the valid candidate locations. In the event that no such candidate locations are present, the method proceeds to step S511 and reverts to the steps of the "map assisted" mode shown in FIG. 2.

Figure 6:
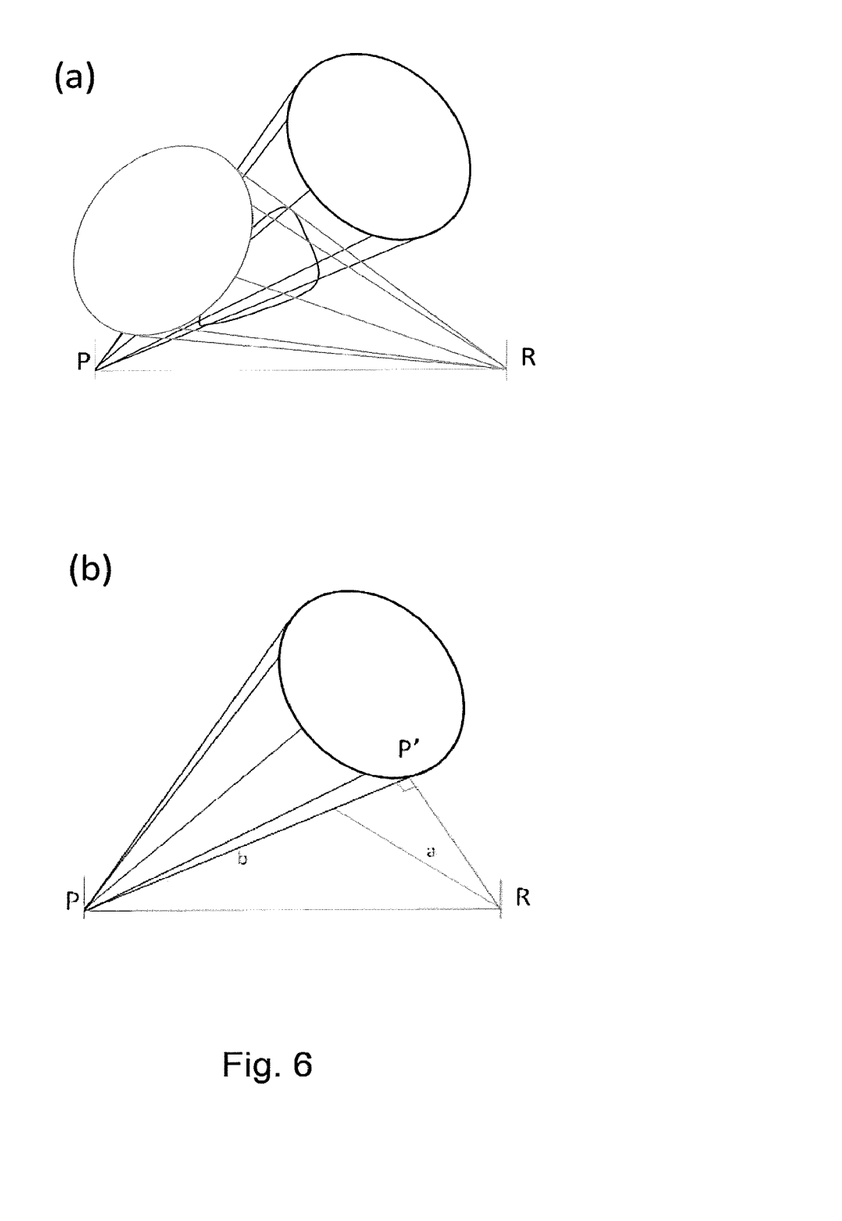
FIG. 6 shows a representation of signal paths as used in an embodiment.

FIG. 6 shows an illustration for understanding how to calculate the candidate location estimates based on different methods. In FIG. 6, the signal paths are represented as conical error regions that are formed from triangulated faces. The intersection region is determined as the points corresponding to the intersection of the triangle edges with the faces.

In FIG. 6(a), the candidate location estimates are calculated using the intersection of the paths (e.g. triangulation) of region that describe the boundary of possible paths. Hence, a set of candidates is formed describing the extremities of the target region (in other words, the boundary of the regions in which the target is located).

FIG. 6(b) shows a method of using one angle estimate with a range estimate obtained by using signal level measurement; here, the candidate locations can be estimated based on one AoA error region and the difference between signal levels measured at points P and R. This method provides a number of discrete candidates that reflect another boundary of the region in which the target is likely to reside. By combining such diverse candidates and eliminating the unfeasible ones as described above, the large set of candidates can be reduced down to a few that are then averaged in order to obtain a candidate location for the present iteration.

It can be seen from FIG. 6 that the size of the error intersection region increases if the radio tag lies close to the path P→R; this can be reduced by additional candidate estimates using a range estimate:

$$b = \frac{-n + \sqrt{n^2 - sc^2}}{s}$$

where: $s=1+10^{\Delta rssi/\alpha}$ and $n=\sqrt{c^2 - |P \rightarrow P'|^2}$.

Here, the path loss exponent, $\alpha$ can be estimated for the propagation environment and $\Delta rssi$ is the signal difference. The value c denotes the distance between the two detector points (see FIG. 1).

Figure 7:
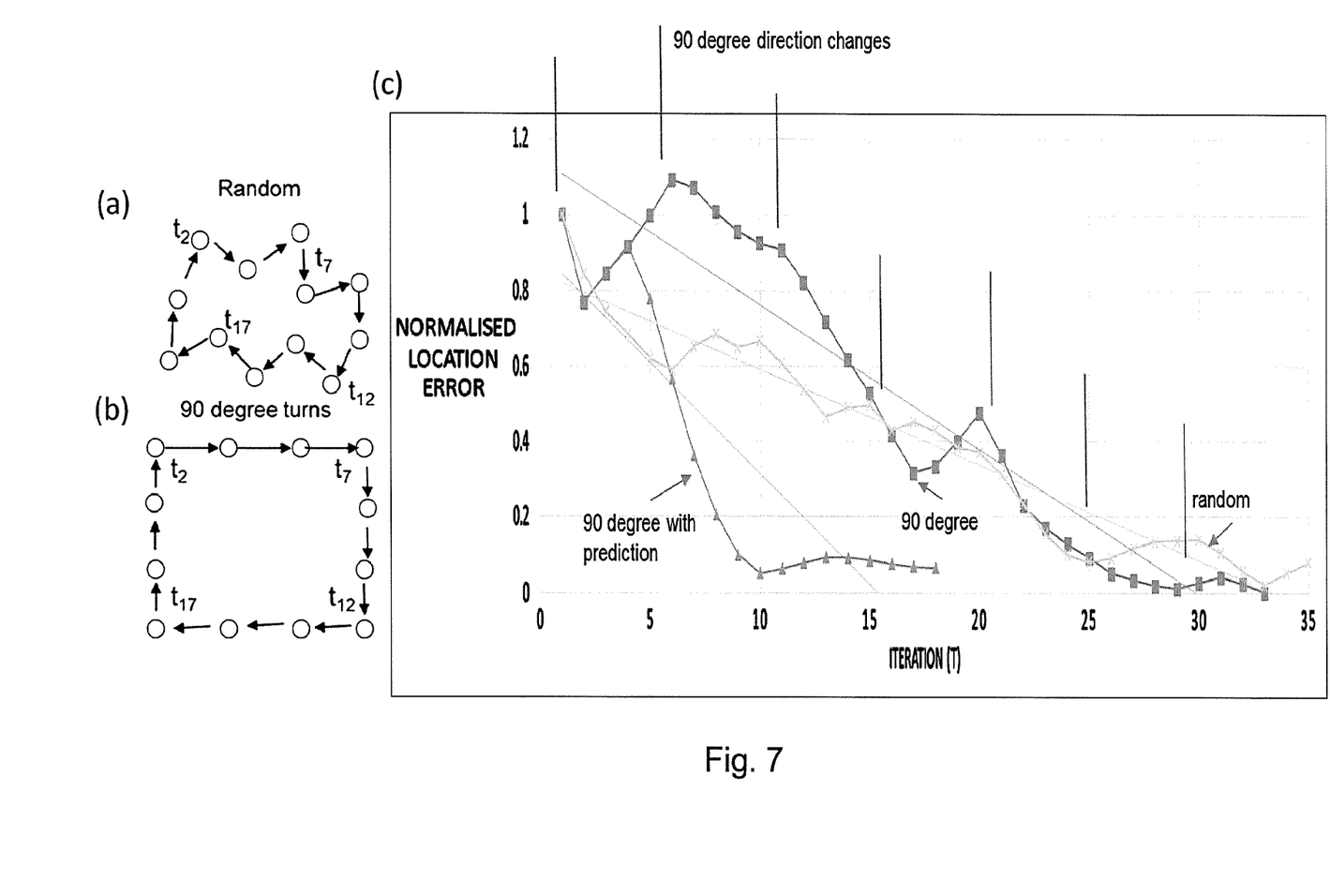
FIG. 7 shows results of simulations using embodiments described herein to localise a target device.

FIG. 7 illustrates the benefit of collecting and analysing data over successive time intervals t in order to localise a radio device from a mobile detector when there is unknown transmitter location (see FIG. 1a). In more detail, FIG. 7(a) shows an example scenario in which the radio tag undergoes a random walk relative to the detector(s), and FIG. 7(b) shows the case in which the radio tag describes a circuit with 4 90 degree turns at temporal measurement points $t_2$, $t_7$, $t_{12}$ and $t_{17}$. The graph of FIG. 7(c) in turn shows how the normalised location errors varies over successive iterations of the method, for the two cases shown in FIGS. 7(a) and 7(b). Referring to FIG. 7(c), it can be seen that at least 30 measurements are needed to accurately locate the transmitter with unknown (random) or 90 degree detector changes in direction. However, with the turns predicted (using the radio map) then only 10 iterations are needed for the same error performance, by selecting the best combination of feasible candidates. Knowing the turns (or changes in direction) means that the most favourable measurement point combinations can be selected leading to more feasible/likely candidates. Note that the same approach can be used in reverse if the radio tag is stationary and the detector is moving (in this example, the detector is assumed to move with constant speed). Without knowledge of the direction of movement the combining of the AoA estimates leads to a number of candidates that are refined and used to locate the target. With random direction changes the convergence is reasonably linear over time (with some perturbations). When the 90 degree turns are used the convergence is saw-toothed due to the sudden changes in direction and prolonged movement in ambiguous directions (i.e. such as to or away from the transmitter). Hence, with estimation of the direction of movement it is possible for a more rapid convergence, exploiting the more optimal combination of candidates; for instance, where the AoA is ambiguous, the signal strength associated with different candidate locations can be used and vice versa.

In some embodiments, a magnetic compass or inertial sensor/accelerometer may be attached to the target device and further used to infer the change in direction or speed of movement of the device in order to help eliminate unfeasible future candidate locations.

Embodiments described herein can provide more accurate localisation in the presence of multi-path reflections mobile device movements and other propagation anomalies (such as the corridor effect) and interference as they can be eliminated more effectively. The time required and the number of measurements can be reduced compared to approaches that rely on surveys or relative harvesting of data as the movement of devices can be predicted. Embodiments do not require a central point (or server) to perform a conversion of the relative harvesting if each collector constructs its own map based on local measurements. In addition, embodiments do not require physical maps or models which can be outdated or are often not readily available.

In some embodiments, the different candidate locations may be weighted based on signal quality before being combined, so as to provide an additional confidence estimate that could be used to assist in the selection of candidate locations.

Embodiments can be used for indoor positioning services which enable mobile devices to accurately locate themselves within buildings (i.e. indoor GPS). The detector (e.g. a mobile collector device) can collect signal vectors periodically (when moving) and the location estimates can be formed based on anchor and other static or mobile radio devices in the environment. The radio map can assist in filtering spurious candidate locations based on estimated obstructions or can be used to guide the selection of which anchors and measurements (and combining) to use.

Embodiments can be used for asset tracking services in which static or mobile collector devices track the location of assets with radio tags. The static (or mobile) collector devices can form radio maps of propagation anomalies using the measurements of the neighbouring static and mobile radios to assist in eliminating the spurious candidate locations of the assets or to more reliably select valid candidates or the most appropriate candidates to combine.

In some embodiments, the radio mapping and radiolocation functionality can be implemented centrally on a server device or in a cloud service by combining the measurements taken by different detectors. Alternatively, each detector can operate independently or in groups. In the event that the detectors operate independently then each detector can form a radio map and perform historic analysis and report their asset location estimates.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the scope of the invention.

The invention claimed is:

1. A method of estimating a location of a target device in a region of space, the method comprising:
    obtaining a first set of detected signals by detecting, at one or more detectors, a beacon signal from the target device, or by detecting at the target device, beacon signals sent from one or more radio transmitters;
    determining, based on characteristics of the first set of detected signals, a current estimate of the location of the target device;
    obtaining a second set of detected signals by detecting, at the one or more detectors, a beacon signal from the target device, or by detecting at the target device, a beacon signal sent from the one or more radio transmitters;
    for the second set of detected signals:
        determining, based on characteristics of the second set of detected signals and the current estimate of the location of the target device, one or more candidate locations for the target device at which the target device is likely located at the present point in time;
        comparing the one or more candidate locations for the target device with a radio map of the region of space, the radio map identifying obstructions to radio wave propagation in the region of space to select one or more feasible candidate locations for the target device; and
        determining a new estimate of the location of the target device based on the one or more feasible candidate locations for the target device.

2. A method according to claim 1, wherein the radio snap is updated each time a second set of detected signals is obtained.

3. A method according to claim 2, wherein the radio map is updated by comparing an expected value for each one of the detected signals with the actual measured value of the detected signal.

4. A method according to claim 1, wherein the determining one or more candidate locations for the target device comprises:
    determining an estimated speed and/or direction in which the target device is moving relative to the one or more detectors or radio transmitters, based at least in part on one or more previous sets of detected signals.

5. A method according to claim 4, wherein the speed and/or direction in which the target device is moving is estimated based at least in part on measurements obtained from a magnetic compass or inertial sensor attached to the target device.

6. A method according to claim 4, wherein the determining one or more candidate locations for the target device comprises:
    determining, based on characteristics of the second set of detected signals, a preliminary set of one or more candidate locations; and
    discarding, from the preliminary set of one or more candidate locations, one or more candidate locations that are not consistent with the current estimate of the location of the target device;
    wherein the step of comparing the candidate locations with a radio map of the region of space is carried out using the preliminary set of one or more candidate locations, with the candidate location(s) that are not consistent with the current estimate of the location of the target device having been discarded.

7. A method according to claim 6, wherein in the event that each one of the preliminary set of candidate locations is discarded, the method comprises revising the estimated speed and/or direction in which the target device is moving.

8. A non-transitory computer readable storage medium comprising computer executable instructions that when executed by a computer will cause the computer to carry out a method of estimating a location of a target device in a region of space, the method comprising:
    obtaining a first set of detected signals by detecting, at one or more detectors, a beacon signal from the target device, or by detecting at the target device, beacon signals sent from one or more radio transmitters;
    determining, based on characteristics of the first set of detected signals, a current estimate of the location of the target device;
    obtaining a second set of detected signals by detecting, at the one or more detectors, a beacon signal from the target device, or by detecting at the target device, a beacon signal sent from the one or more radio transmitters;
    for the second set of detected signals:
        determining, based on characteristics of the second set of detected signals and the current estimate of the location of the target device, one or more candidate locations for the target device at which the target device is likely located at the present point in time;
        comparing the one or more candidate locations for the target device with a radio map of the region of space, the radio map identifying obstructions to radio wave propagation in the region of space to select one or more feasible candidate locations for the target device; and determining a new estimate of the location of the target device based on the one or more feasible candidate locations for the target device.

9. A location method of estimating a location of a target device in a region of space, the method comprising:

obtaining a first set of detected signals by detecting, at one or more detectors, a beacon signal from the target device, or by detecting at the target device, beacon signals sent from one or more radio transmitters;

determining, based on characteristics of the first set of detected signals, a current estimate of the location of the target device; and for each of one or more iterations:

predicting, based at least in part on the current estimate of the location of the target device, one or more new candidate locations for the target device at which the target device is likely located at the present point in time;

comparing the one or more candidate locations for the target device with a radio map of the region of space, the radio map identifying obstructions to radio wave propagation in the region of space to select one or more feasible candidate locations for the target device;

determining, based on the feasible candidate locations, a sub-region of space in which the target device is predicted to be located for the target device;

obtaining a second set of detected signals by detecting, at one or more detectors in the sub-region of space, a beacon signal sent from the target device, or by detecting at the target device, a beacon signal sent from one or more radio transmitters in the sub-region of space; and determining, based on characteristics of the second set of detected signals and the one or more feasible locations, a new estimate of the location of the target device.

10. A method according to claim 9, wherein the radio map is updated each time a second set of detected signals is obtained.

11. A method according to claim 10, wherein the radio map is updated by comparing an expected value for each one of the detected signals with the actual measured value of the detected signal.

12. A method according to claim 9, wherein the determining one or more candidate locations for the target device comprises:

determining an estimated speed and/or direction in which the target device is moving relative to the one or more detectors or radio transmitters, based at least in part on one or more previous sets of detected signals.

13. A method according to claim 12, wherein the speed and/or direction in which the target device is moving is estimated based at least in part on measurements obtained from a magnetic compass or inertial sensor attached to the target device.

* * * * *